J. W. BRADY.
MOISTURE PROOF WOOD FLOOR.
APPLICATION FILED MAR. 19, 1910.
978,352.
Patented Dec. 13, 1910.
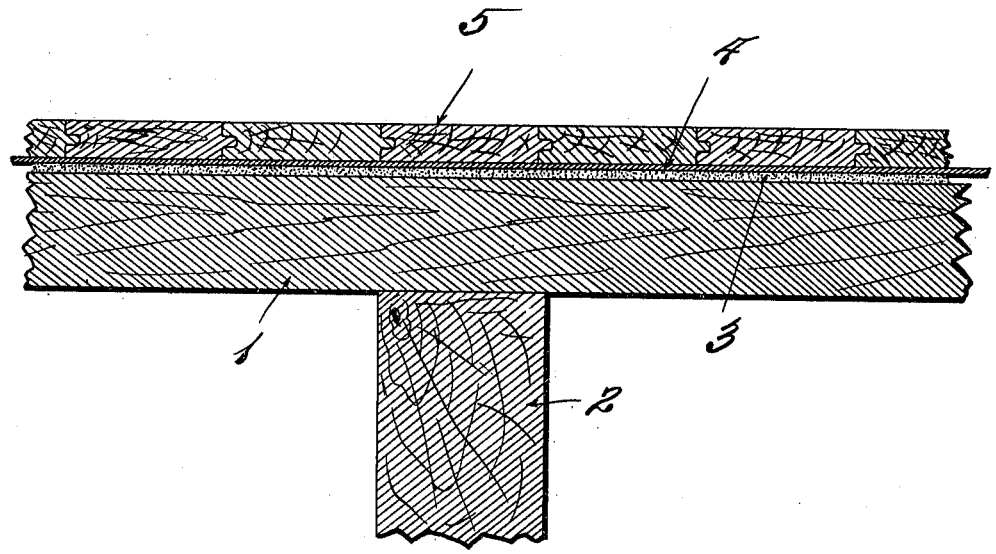
WITNESSES.
E. M. Harrington.
Wm. Jamus.
INVENTOR.
JOHN W. BRADY.
BY F. R. Cornwall. ATT.

UNITED STATES PATENT OFFICE.

JOHN W. BRADY, OF ST. LOUIS, MISSOURI.

MOISTURE-PROOF WOOD FLOOR.

978,352.  Specification of Letters Patent.  Patented Dec. 13, 1910.

Application filed March 19, 1910. Serial No. 550,538.

*To all whom it may concern:*

Be it known that I, JOHN W. BRADY, a citizen of the United States, residing at St. Louis, Missouri, have invented a certain new and useful Improvement in Moisture-Proof Wood Floors, of which the following is a full, clear, and exact description, such as will enable others skilled in the art to which it appertains to make and use the same, reference being had to the accompanying drawings, forming part of this specification, in which the figure is a sectional elevation of a section of flooring laid in accordance with my invention.

My invention relates to a moisture proof wood floor, the principal object of my invention being to provide simple means whereby hard wood flooring and parquetry is protected from moisture particularly on the under side or bottom of the flooring.

The top surface of ordinary hard wood flooring and parquetry is always finished with a suitable wood filler, shellac and the like, and being thus finished the top surface of the flooring is impervious to moisture. This flooring is ordinarily laid upon a sub-flooring and the under surface of the hard wood flooring or parquetry is unprotected and, therefore, readily absorbs moisture. Such action causes the hard wood flooring to swell and warp, thereby forming an uneven top surface, and spoiling the much desired smooth and finished hard wood surface.

I propose to thoroughly protect the under side of hard wood flooring and parquetry by locating immediately beneath the hard wood flooring a layer of chalk or analogous substance which possess great absorbent properties, and thus the hard wood flooring or parquetry after being properly laid will maintain its smooth finished surface owing to the fact that it is protected against moisture on both top and bottom surfaces.

To the above purposes my invention consists in the features of novelty hereinafter described and claimed.

Referring by numerals to the accompanying drawings 1 designates the sub-flooring which is laid in the usual manner upon floor girders 2 or other suitable supports.

3 designates a layer of pulverized chalk or analogous material having absorbent properties and which material is always reactive to moisture and which will not harden when dry. Located immediately on top of this layer of chalk or analogous material is a layer 4 of oiled building paper 4 or like material. When the hard wood flooring or parquetry is to be laid the paper 4 is covered with a solution consisting of one part paraffin wax to eight or ten parts paraffin oil, and which solution is thinned to the desired consistency with benzin or naphtha. This solution is applied to the top surface of the building paper with a brush and while the solution is still in a semi-liquid state the hard wood flooring or parquetry 5 is laid directly on top of the coated paper, and is nailed or fastened in the usual manner. The top surface of the hard wood flooring or parquetry is now finished in the usual manner. Wood filler, shellac and wax are ordinarily used in finishing the top surface of hard wood flooring, and this finish renders said top surface impervious to moisture, and where the hard wood flooring or parquetry is laid by my improved method the layer of chalk together with the coated layer of building paper thoroughly protects the under side of the hard wood flooring or parquetry and prevents any moisture from reaching the under surface of said hard wood flooring.

I prefer to use pulverized chalk as the absorbent between the sub-flooring and the layer of paper, inasmuch as, chalk has an affinity for moisture, and it will not harden when dry, but is reactive and will thus continue to afford protection for the under side of the hard wood flooring.

Where a floor is laid in accordance with my improved method all moisture which ordinarily would collect on the under side of the flooring will be absorbed by the layer of chalk or other material, and held thereby until a dry atmosphere withdraws and absorbs the moisture from the body of chalk, and in this manner all moisture is prevented from passing upward into the hard wood flooring or parquetry.

The materials used in my improved method are comparatively cheap, and therefore, but very little cost is added to a hard wood floor laid in accordance with my invention.

I claim:

1. The herein described flooring consisting of a sub-floor, a layer of reactive pulverized absorbent material on said sub-floor, a sheet of water proof material above the layer of pulverized absorbent material, and an upper floor on top of the thin sheet of material.

2. The herein described flooring comprising a sub-floor, a layer of pulverized absorbent material thereon, a thin sheet of wax coated material on the layer of pulverized material and an upper floor on top of the thin sheet of material.

3. The herein described flooring consisting of a sub-floor, a layer of pulverized chalk thereon, a sheet of wax coated paper on the layer of chalk, and an upper floor on the sheet of wax coated paper.

4. The combination with a hard wood flooring of a thin sheet of water proof material applied to the under side of said hard wood flooring, and a layer of reactive pulverized absorbent material applied to the under side of the layer of pulverized absorbent material.

5. The combination with a hard wood flooring, of a thin sheet of water proof material applied to the under side of said hard wood flooring, a layer of reactive pulverized absorbent material applied to the under side of the sheet of waterproof material, and a support for the layer of pulverized material and the sheet of water proof material.

In testimony whereof I hereunto affix my signature in the presence of two witnesses, this 15th day of March, 1910.

JOHN W. BRADY.

Witnesses:
M. P. SMITH,
E. M. HARRINGTON.